(12) United States Patent  (10) Patent No.: US 8,441,474 B2
Nedeljkovic et al.  (45) Date of Patent: May 14, 2013

(54) METHOD AND SYSTEM FOR SETTING DISPLAY RESOLUTION

(75) Inventors: Petar Nedeljkovic, Oatley (AU); Peter John Gerrone, Beaconsfield (AU); Zoran Tomicic, Woronora (AU)

(73) Assignee: Aristocrat Technologies Australia Pty Limited (AU)

( * ) Notice: Subject to any disclaimer, the term of this patent is extended or adjusted under 35 U.S.C. 154(b) by 892 days.

(21) Appl. No.: 12/489,840

(22) Filed: Jun. 23, 2009

(65) Prior Publication Data

US 2009/0322803 A1  Dec. 31, 2009

(30) Foreign Application Priority Data

Jun. 25, 2008 (AU) .................................. 2008903234

(51) Int. Cl.
*G06T 15/00* (2011.01)

(52) U.S. Cl.
USPC ............................ 345/418; 345/428; 345/581

(58) Field of Classification Search .................. 345/418, 345/428, 581
See application file for complete search history.

(56) References Cited

U.S. PATENT DOCUMENTS

| | | |
|---|---|---|
| 3,639,054 A | 2/1972 | Wally, Jr. |
| 3,985,331 A | 10/1976 | Riley et al. |
| 4,054,049 A | 10/1977 | Egger |
| 4,289,142 A | 9/1981 | Kearns |
| 4,387,722 A | 6/1983 | Kearns |
| 4,631,423 A | 12/1986 | Faris |
| 4,789,794 A | 12/1988 | Whiteley et al. |
| 4,866,302 A | 9/1989 | Whiteley et al. |
| 5,086,385 A | 2/1992 | Launey et al. |
| 5,309,520 A | 5/1994 | Meckley |
| 5,452,337 A | 9/1995 | Endo et al. |
| 5,592,237 A | 1/1997 | Greenway et al. |
| 5,777,778 A | 7/1998 | Yao |
| 6,016,150 A | 1/2000 | Lengyel et al. |
| 6,216,214 B1 | 4/2001 | Bryg et al. |

(Continued)

FOREIGN PATENT DOCUMENTS

| | | |
|---|---|---|
| CA | 1158725 | 12/1983 |
| CA | 2307031 | 4/1999 |

(Continued)

OTHER PUBLICATIONS

Hansper, George, XF86Config Demystified, Aug. 2, 1999, pp. 1-13.*

(Continued)

*Primary Examiner* — Phu K Nguyen
(74) *Attorney, Agent, or Firm* — McAndrews, Held & Malloy, Ltd.

(57) ABSTRACT

A computing system with a graphical windowing server displaying to a display, and a method for setting the resolution of a display to which a computing device displays. The method comprises running a graphical windowing server with a digital connection enabled between the display and a graphics adapter for the display, querying the display with the digital connection for display modes supported by the display, receiving returned mode data, the mode data being indicative of one or more display modes supported by the display, shutting down the graphical windowing server, composing a modeline for the display according to the returned mode data and a desired resolution, running the graphical windowing server with the digital connection disabled and the modeline, and loading a graphics specification corresponding to the resolution indicated by the modeline.

20 Claims, 6 Drawing Sheets

U.S. PATENT DOCUMENTS

| | | |
|---|---|---|
| 6,243,383 B1 | 6/2001 | Li et al. |
| 6,430,670 B1 | 8/2002 | Bryg et al. |
| 6,580,911 B1 | 6/2003 | Clancy |
| 6,738,311 B1 | 5/2004 | Guigne |
| 6,831,918 B1 | 12/2004 | Kavak |
| 7,237,872 B1 | 7/2007 | Spehrley, Jr. et al. |
| 2001/0043604 A1 | 11/2001 | Li et al. |
| 2002/0060801 A1 | 5/2002 | Motamed et al. |
| 2003/0006996 A1 | 1/2003 | Youngblood et al. |
| 2003/0016228 A1 | 1/2003 | Youngblood et al. |
| 2003/0122874 A1 | 7/2003 | Dieberger et al. |
| 2004/0005243 A1 | 1/2004 | Mulhern et al. |
| 2004/0075849 A1 | 4/2004 | Jacobsen et al. |
| 2004/0082980 A1 | 4/2004 | Mouine et al. |
| 2005/0007396 A1 | 1/2005 | Hatori et al. |
| 2005/0045836 A1 | 3/2005 | Crosland et al. |
| 2005/0088669 A1 | 4/2005 | Suino et al. |
| 2006/0028663 A1 | 2/2006 | Maeda |
| 2006/0047713 A1 | 3/2006 | Gornshtein et al. |
| 2006/0087553 A1 | 4/2006 | Kenoyer et al. |
| 2007/0108286 A1 | 5/2007 | Patel |

FOREIGN PATENT DOCUMENTS

| | | |
|---|---|---|
| CA | 2436795 | 4/2002 |
| CN | 1960260 | 5/2007 |
| DE | 4107085 | 10/1991 |
| DE | 19716095 | 11/1997 |
| EP | 0284304 | 9/1988 |
| EP | 0649137 | 4/1995 |
| EP | 0949081 | 10/1999 |
| EP | 1369706 | 12/2003 |
| EP | 1600806 | 11/2005 |
| EP | 1725037 A2 | 11/2006 |
| EP | 1815793 | 8/2007 |
| FR | 2836747 | 9/2003 |
| GB | 797513 | 7/1958 |
| GB | 905244 | 9/1962 |
| GB | 1023274 | 3/1966 |
| GB | 1030173 | 5/1966 |
| GB | 1159831 | 7/1969 |
| GB | 1247793 | 9/1971 |
| GB | 1324499 | 7/1973 |
| GB | 1357615 | 6/1974 |
| GB | 1358619 | 7/1974 |
| GB | 1447981 | 9/1976 |
| GB | 1517313 | 7/1978 |
| GB | 2413023 | 10/2005 |
| IT | 1271061 | 5/1997 |
| JP | 54092192 | 7/1979 |
| JP | 54099514 | 8/1979 |
| JP | 56154881 | 11/1981 |
| JP | 57127275 | 8/1982 |
| JP | 58063278 | 4/1983 |
| JP | 58184966 | 10/1983 |
| JP | 58191943 | 11/1983 |
| JP | 59162430 | 9/1984 |
| JP | 59178534 | 10/1984 |
| JP | 61261975 | 11/1986 |
| JP | 63014730 | 1/1988 |
| JP | 1137320 | 5/1989 |
| JP | 1137781 | 5/1989 |
| JP | 1233316 | 9/1989 |
| JP | 1304650 | 12/1989 |
| JP | 1305037 | 12/1989 |
| JP | 3018731 | 1/1991 |
| JP | 3075690 | 3/1991 |
| JP | 3134353 | 6/1991 |
| JP | 3265024 | 11/1991 |
| JP | 4152289 | 5/1992 |
| JP | 4290982 | 10/1992 |
| JP | 5130990 | 5/1993 |
| JP | 5216800 | 8/1993 |
| JP | 6076771 | 3/1994 |
| JP | 6090444 | 3/1994 |
| JP | 7186411 | 7/1995 |
| JP | 8085614 | 4/1996 |
| JP | 8244287 | 9/1996 |
| JP | 9099132 | 4/1997 |
| JP | 9261454 | 10/1997 |
| JP | 9274892 | 10/1997 |
| JP | 10082898 | 3/1998 |
| JP | 10247131 | 9/1998 |
| JP | 10253939 | 9/1998 |
| JP | 11221916 | 8/1999 |
| JP | 11223574 | 8/1999 |
| JP | 2000070258 | 3/2000 |
| JP | 2000227306 | 8/2000 |
| JP | 2000292210 | 10/2000 |
| JP | 2002221405 | 8/2002 |
| JP | 2002247309 | 8/2002 |
| JP | 2003162260 | 6/2003 |
| JP | 2003180659 | 7/2003 |
| JP | 2003302350 | 10/2003 |
| JP | 2004073488 | 3/2004 |
| JP | 2004279948 | 10/2004 |
| JP | 2005049303 | 2/2005 |
| JP | 2007078819 | 3/2007 |
| KR | 20010061342 | 7/2001 |
| KR | 20040011936 | 2/2004 |
| KR | 20040098687 | 11/2004 |
| MX | 96000810 | 8/2004 |
| TW | 403868 | 9/2000 |
| WO | 9118383 | 11/1991 |
| WO | 9424666 | 10/1994 |
| WO | 9705712 | 2/1997 |
| WO | 0013079 | 3/2000 |
| WO | 0026068 | 5/2000 |
| WO | 0079512 | 12/2000 |
| WO | 0116764 | 3/2001 |
| WO | 01/27730 A2 | 4/2001 |
| WO | 2004034018 | 4/2004 |

OTHER PUBLICATIONS

Shumway, Christopher, FreeBSD handbook: Chapter 6 The X Window System. copyrght 1995-2012, pp. 1-7.*

* cited by examiner

METHOD AND SYSTEM FOR SETTING DISPLAY RESOLUTION

RELATED APPLICATIONS

This application claims priority to Australian Provisional Patent Application No. 2008903234 having a filing date of Jun. 25, 2008, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a method and system for setting display resolution.

It is known to provide a gaming system which comprises a game controller arranged to randomly display several symbols from a predetermined set of symbols and to determine a game outcome such as a game win based on the displayed symbols. Such gaming systems may commonly be implemented as a video machine wherein selected symbols are displayed on virtual reels on a video monitor. It is known to detect the monitor screen resolution using the monitor Display Data Channel (DDC), which is used for communications between graphics hardware and the monitor. If a gaming system employs the X (trade mark) window system and DDC is turned on in the X server configuration file, X automatically attempts to set the screen resolution and refresh rate to one that is supported by the monitor. However, this is a problem if it is desired to used the monitor with another resolution.

BRIEF SUMMARY OF THE INVENTION

In accordance with a first aspect of the present invention, there is provided a method of setting the resolution of a display to which a computing device with a graphical windowing server displays, comprising:
running the graphical windowing server with a digital connection (such as a Display Data Channel) enabled between the display and a graphics adapter for the display;
querying the display with the digital connection for display modes supported by the display;
receiving returned mode data, said mode data being indicative of one or more display modes supported by the display;
shutting down the graphical windowing server;
composing a modeline for the display according to the returned mode data and a desired resolution;
running the graphical windowing server with the digital connection disabled and the modeline; and
loading a graphics specification corresponding to the resolution indicated by the modeline.

In a particular embodiment, the graphical windowing server comprises an X based graphical window server, the digital connection comprises a Display Data Channel and the graphics specification is contained in an Xresources file.

In other embodiments of the present invention, the graphical windowing server may comprise, for example:

a Sun Microsystems NeWS (trade mark) server;
a NeXT Display Postscript (trade mark) server; or
an Apple Corporation Quartz (trade mark) server.

It will be appreciated by the skilled person, therefore, that the term 'modeline' is used in a broad sense and refers to any string or strings that characterize a display mode; it is not limited to the particular string employed in X based graphical window servers.

The method may include selecting the desired resolution according to a resolution or resolutions identified by the returned mode data.

That is, the user may select a resolution from the supported resolutions.

In another embodiment, composing the modeline may comprise modifying a resolution identified by the returned mode data according to the desired resolution.

The mode data generally comprises a modeline or modelines.

In one embodiment, the method comprises saving the returned mode data; this may comprise writing the returned mode data to a file, such as—in X server embodiments—/var/log/xorg.log.

In one embodiment, querying the display comprises controlling the graphical windowing server (e.g. an X server) to query the display with the digital connection (e.g. a Display Data Channel), such as—in X server embodiments—by executing an xrandr utility program.

The method may include conducting a search of the returned mode data for data (such as a text string) indicative of one or more supported or desired graphics standards or resolutions.

In one embodiment, the one or more graphics standards or resolutions comprises VGA (in which case the method may include conducting a search for the string "VGA connected"). In another embodiment, the one or more graphics standards or resolutions comprises a number of columns (such as by conducting a search for the string "Modeline "1680x"). In another embodiment, the one or more graphics standards or resolutions comprises a number of rows (such as by conducting a search for the string "x1024").

In one embodiment, loading the graphics specification (from, for example, an Xresources file) comprises controlling the graphical windowing server to load the graphics specification, such as—in X server embodiments—with the xrdb utility program.

The graphical windowing server (such as an X server) may display to a plurality of different displays, and the method may comprise setting the resolution of each of the plurality of displays either to respective different resolutions or to an identical resolution.

In accordance with a second aspect of the present invention, there is provided a computing system with a graphical windowing server displaying to a display, the computing system arranged to:
run the graphical windowing server with a digital connection enabled between the display and a graphics adapter for the display;
query the display with the digital connection for display modes supported by the display;
receive returned mode data, said mode data being indicative of one or more display modes supported by the display;
shut down the graphical windowing server;
compose a modeline for the display according to the returned mode data and a desired resolution;
run the graphical windowing server with the digital connection disabled and the new modeline; and load a graphics specification corresponding to the resolution indicated by the new modeline.

In one embodiment, the graphical windowing server comprises an X server, the digital connection comprises a Display Data Channel and the graphics specification is contained in an Xresources file.

The computing system may be arranged to conduct a search of returned mode data for data indicative of one or more desired or supported graphics standards or resolutions.

In some embodiments the computing system comprises the display, and in some other embodiments the computing system does not comprise the display.

The invention also provides computer program code that when executed by a processor implements the method described above. The invention also provides a computer readable medium comprising that program code.

In addition, the invention provides a data packet or packets comprising computer program code that when executed by a processor implements the method described above.

It should be understood that each of the various aspects of the invention may include any of the optional features described above, and in any desired combination that does not give rise to inconsistencies.

BRIEF DESCRIPTION OF SEVERAL VIEWS OF THE DRAWINGS

In order that the invention may be more clearly ascertained, embodiments will now be described, by way of example, with reference to the accompanying drawing, in which.

DETAILED DESCRIPTION OF THE INVENTION

According to embodiments of the invention there is provided a gaming system in which a player plays a spinning reel type game or games. An award is determined for the game or games. The reels spin about an axis in a conventional manner to display a sequence of symbols and in due course may form a winning pattern (such as a win line). According to embodiments of the present invention, the reels are each of apparent three-dimensional, torus form. In one example, the torus has a circular cross section, and in another example a square cross section. It will be appreciated, however, that essentially any cross section can be used provided it is suitable for displaying the symbols.

The gaming system may be provided in a number of different forms.

In a first form, a stand-alone gaming machine is provided in which all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 1:
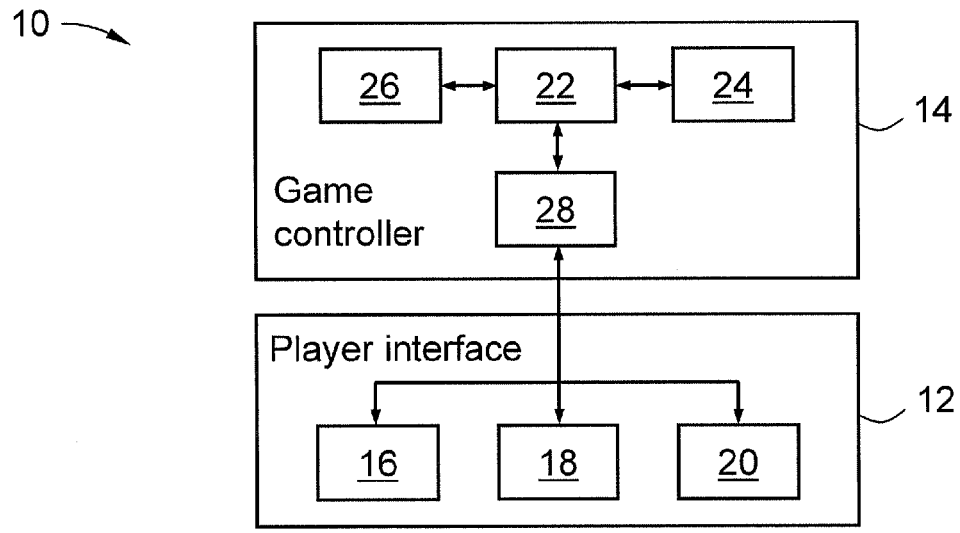
FIG. 1 is a block diagram of the core components of a gaming system according to an embodiment of the invention.

Irrespective of the form, the gaming system comprises several core components. Referring to FIG. 1, at the broadest level the core components are a player interface 12 and a game controller 14, as illustrated schematically at 10 in FIG. 1.

Player interface 12 is arranged to enable manual interaction between a player and the gaming system and for this purpose includes the input/output components required for the player to enter instructions and play the game. Components of the player interface may vary from embodiment to embodiment but will typically include a credit mechanism 16 to enable a player to input credits and receive payouts, a display 18 (comprising two monitors) and a game play mechanism 20 that enables a player to input game play instructions. The game play mechanism 20 comprises one or more input devices, such as buttons and a touch screen.

Game controller 14 is in data communication with the player interface and typically includes a processor 22 that processes the game play instructions in accordance with game play rules and outputs game play outcomes to the display. Typically, the game play instructions are stored as program code in a memory 24 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. Game controller 14 also includes an operating system 26 (in the form of one of the UNIX (trade mark) family of operating systems) and an X11 based graphical windowing server 28, which receives input from game play mechanism 20 and displays to display 18.

Figure 2:
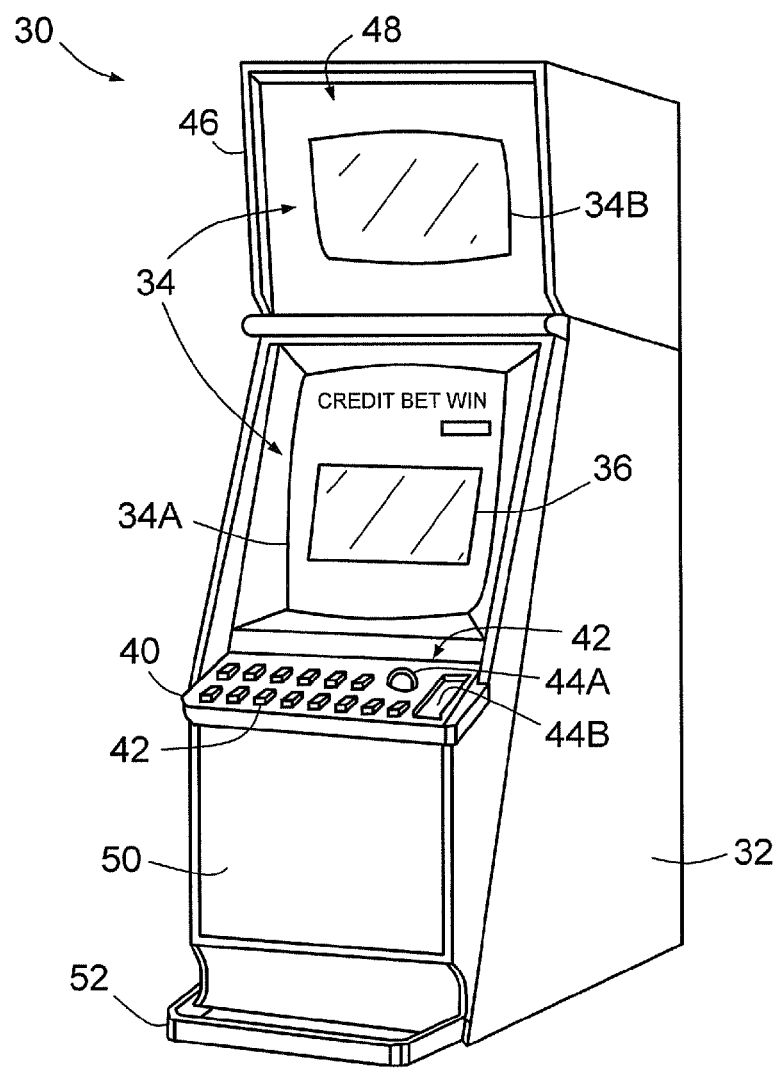
FIG. 2 is a perspective view of a gaming machine according to an embodiment of the invention.

A gaming system in the form of a stand alone gaming machine 10 according to another embodiment of the invention is shown schematically at 30 in FIG. 2. The gaming machine 30 includes a console 32 having a display 34 comprising a main video display unit or monitor 34A on which is displayed representations of a game 36 that can be played by a player. A mid-trim 40 of the gaming machine 30 houses a bank of buttons 42 for enabling a player to interact with the gaming machine, in particular during game play. The mid-trim 40 also houses a credit input mechanism 44 that, in this example, includes a coin input chute 44A and a bill collector 44B. Other credit input mechanisms may also be employed, such as a card reader for reading a smart card, debit card or credit card. A player marketing module may be provided having a reading device may also be provided for the purpose of reading a player tracking device, for example as part of a loyalty program. The player tracking device may be in the form of a card, flash drive or any other portable storage medium capable of being read by the reading device.

A top box 46 may carry artwork 48 including, for example, pay tables and details of bonus awards and other information or images relating to the game. Further artwork and/or information may be provided on a front panel 50 of the console 32. A coin tray 52 is mounted beneath the front panel 50 for dispensing cash payouts from the gaming machine 30.

Main monitor 34A of display 34 is, as described above, in the form of a video display, particularly a cathode ray tube screen device. Alternatively, the main monitor of display 34 may be a liquid crystal display, plasma screen, or any other suitable video display unit. Display 34 also includes a secondary monitor, in the form of second monitor 34B, located in top box 46' thus, display 34 comprises two monitors, main monitor 34A and second monitor 34B. Second monitor 34B may be of the same type as main monitor 34A, or of a different type.

Figure 3:
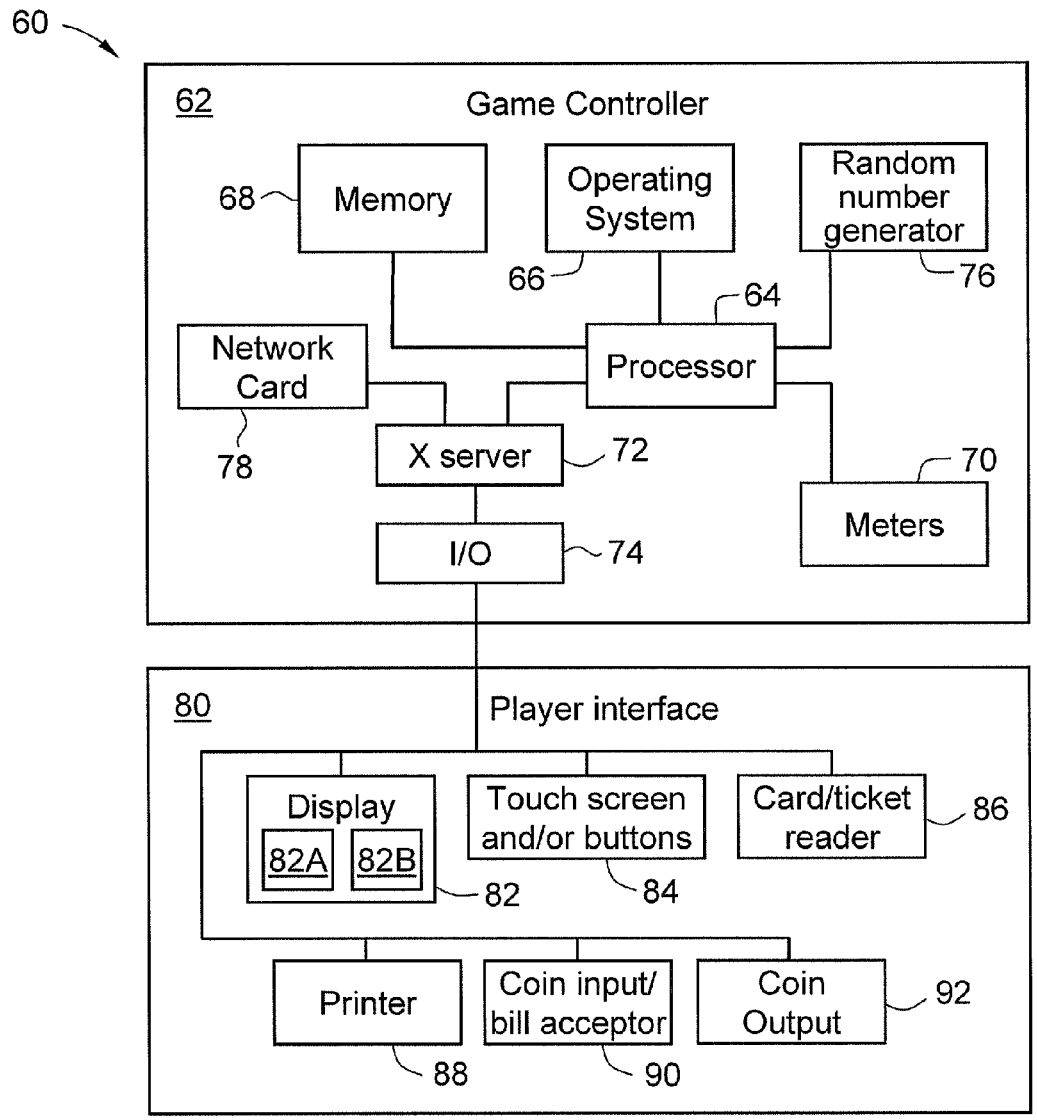
FIG. 3 is a block diagram of the functional components of a gaming machine according to an embodiment of the invention.

FIG. 3 is a schematic block diagram of a typical gaming machine 60 according to the present invention, in which only the operative components are shown for clarity. Gaming machine 60 may be the same as or different from gaming machine 30 of FIG. 2. Gaming machine 60 includes a game controller 62 having a processor 64 and an operating system 66 in the form of one of the UNIX (trade mark) family of operating systems, such as UNIX (trade mark), IAX (trade mark) or Linux (trade mark). Instructions and data to control operation of processor 64 are stored in a memory 68, which is in data communication with processor 64. Typically, gaming machine 60 includes both volatile and non-volatile memory and more than one of each type of memory, with such memories being collectively represented by memory 68.

Gaming machine 60 has hardware meters 70 for purposes including ensuring regulatory compliance and monitoring player credit, an X server 72 for receiving input from processor 64 and displaying to display 82 (see below), and an input/output (I/O) interface 74 for communicating with peripheral devices of gaming machine 60. Input/output interface 74, the peripheral devices or both may be intelligent devices with their own memory for storing associated instructions and data for use with the input/output interface 74 or the peripheral devices.

Gaming machine 60 also includes a random number generator module 76 generates random numbers for use by the processor 102. Persons skilled in the art will appreciate that the reference to random numbers includes pseudo-random numbers.

In addition, gaming machine 60 may include a communications interface, for example a network card 78. Network card 78 may, for example, send status information, accounting information or other information to a central controller, server or database and receive data or commands from the central controller, server or database.

In the example shown in FIG. 3, gaming machine 60 includes a player interface 80 that includes peripheral devices that communicate with game controller 62. These peripheral devices comprise a display 82, a touch screen and/or buttons 84, a card and/or ticket reader 86, a printer 88, a bill acceptor and/or coin input mechanism 90 and a coin output mechanism 92. Additional hardware may be included as part of the gaming machine 60, or hardware may be omitted as required for the specific implementation.

Figure 4:
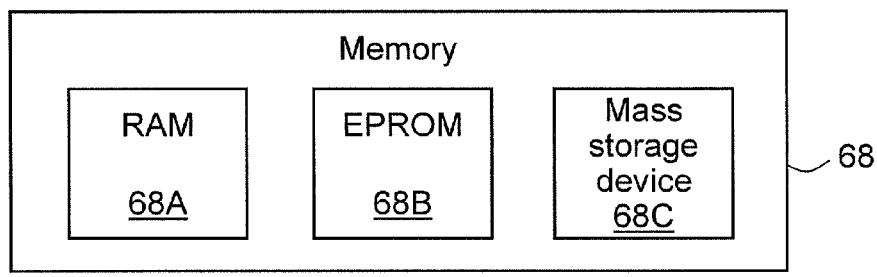
FIG. 4 is a block diagram representing the structure of a memory according to an embodiment of the invention.

FIG. 4 shows a block diagram of the main components of an exemplary memory 68. Memory 68 includes RAM 68A, EPROM 68B and a mass storage device 68C. RAM 68A typically temporarily holds program files for execution by the processor 64 and related data. EPROM 68B may be a boot ROM device and/or may contain some system or game related code. Mass storage device 68C is typically used to store game programs, the integrity of which may be verified and/or authenticated by processor 64 using protected code from EPROM 68B or elsewhere.

It is also possible for the operative components of the gaming machine 60 to be distributed; for example, input/output devices 82, 84, 86, 88, 90, 92 may be provided remotely from game controller 62.

Figure 5:
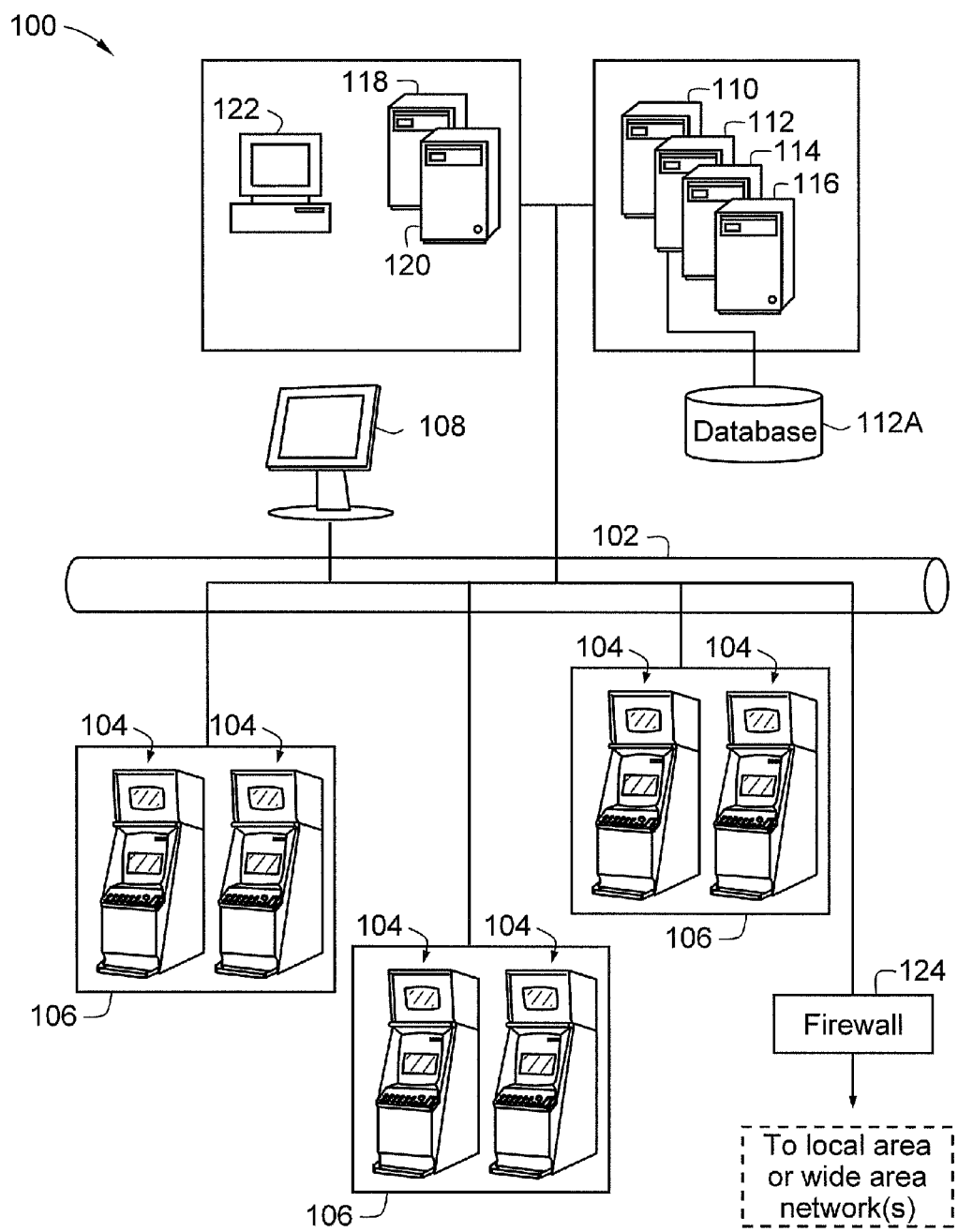
FIG. 5 is a diagram schematic of a networked gaming system according to an embodiment of the invention.

FIG. 5 shows a gaming system 100 in accordance with an alternative embodiment. Gaming system 100 includes a network 102 that may be, for example, an Ethernet network. Gaming machines 104, shown arranged in three banks 106 of two gaming machines 104 in FIG. 5, are connected to the network 102. Gaming machines 104 provide a player operable interface and may be the same as gaming machines 30, 60 shown in FIGS. 2 and 3, or may have simplified functionality depending on the requirements for implementing game play. While banks 106 of two gaming machines are illustrated in FIG. 5, banks of one, three or more gaming machines are also envisaged.

One or more displays 108 may also be connected to the network 102. Displays 108 may, for example, be associated with one or more banks 106 of gaming machines. Displays 108 may be used to display representations associated with game play on gaming machines 104, to display other representations, such as promotional or informational material, or both.

In a thick client embodiment, game server 110 of gaming system 100 implements part of the game played by a player using a gaming machine 104 and gaming machine 104 implements part of the game. With this embodiment, as both the game server and the gaming machine implement part of the game, they collectively provide a game controller. A database management server 112 may manage storage of game programs and associated data for downloading or access by the gaming devices 104 in a database 112A. Typically, if the gaming system enables players to participate in a Jackpot game, a Jackpot server 114 will be provided to carry out the accounting in respect of the Jackpot game. A loyalty program server 116 may also be provided.

In a thin client embodiment, game server 110 implements most or all of the game played by a player using a gaming machine 104 and gaming machine 104 essentially provides only the player interface. With this embodiment, game server 110 provides the game controller. Gaming machine 104 receives player instructions, passes these to game server 110, which then processes them and returns game play outcomes to gaming machine 104 for display. In a thin client embodiment, gaming machines 104 may be computer terminals, such as PCs running software that provides a player interface operable using standard computer input and output components.

Servers are also typically provided to assist in the administration of gaming system 100 including, for example, a gaming floor management server 118, and a licensing server 120 to monitor the use of licenses relating to particular games. An administrator terminal 122 is provided to allow an administrator to run network 102 and the devices connected to the network.

Gaming system 100 may communicate with other gaming systems, with other local networks such as a corporate network, with a wide area network such as the Internet, for example through a firewall 124, or a combination of these.

Persons skilled in the art will appreciate that, in accordance with known techniques, functionality at the server side of gaming system 100 may be distributed over a plurality of different computers. For example, elements may be run as a single "engine" on one server or a separate server may be provided. For example, game server 110 could run a random generator engine. Alternatively, a separate random number generator server could be provided. Further, persons skilled in the art will appreciate that a plurality of games servers could be provided to run different games or a single game server may run a plurality of different games as required by the terminals.

As discussed above, embodiments are provided according to the present invention that are implemented in relation to a spinning reel type game, the gaming systems for implementing these games having a video display 18, 34, 82. The characteristics of displays 18, 34, 82 may differ from one implementation of gaming machine 30, 104 or gaming system 100 to another, and even from one gaming machine 104 to another with gaming system 100. For example, in one gaming machine 30, 104 according to these embodiments, display 18, 34, 82 has a native resolution of 1280×1024. In another gaming machine 30, 104 according to these embodiments, display 18, 34, 82 has a native resolution of 1680×1050. Display 18, 34, 82 with 1280×1024 resolution can be connected with a VGA or DVI connector. As these displays have significantly different aspect ratios, unacceptable horizontal stretching would occur if they were used with the same display resolution, so gaming machines 30, 104 and gaming systems 100 according to these embodiments are configured to detect the resolution of display 18, 34, 82 and adjust display resolution accordingly.

However, display 18, 34, 82 comprises two monitors 18A, 18B, 34A, 34B, 82A, 82B. Some existing graphics hardware exhibits severe performance reduction when the vertical resolution of the whole display area (in this example comprising two monitors) exceeds 2048 pixels. Hence, even if one or both of monitors 18A, 18B, 34A, 34B, 82A, 82B constituting display 18, 34, 82 have a resolution of 1680×1050, according to the above embodiments the displayed resolution is set to 1680×1024 in both monitors 18A, 18B, 34A, 34B, 82A, 82B. In addition, the display refresh rate is set to 60 Hz for reasons of backward compatibility.

Figure 6:
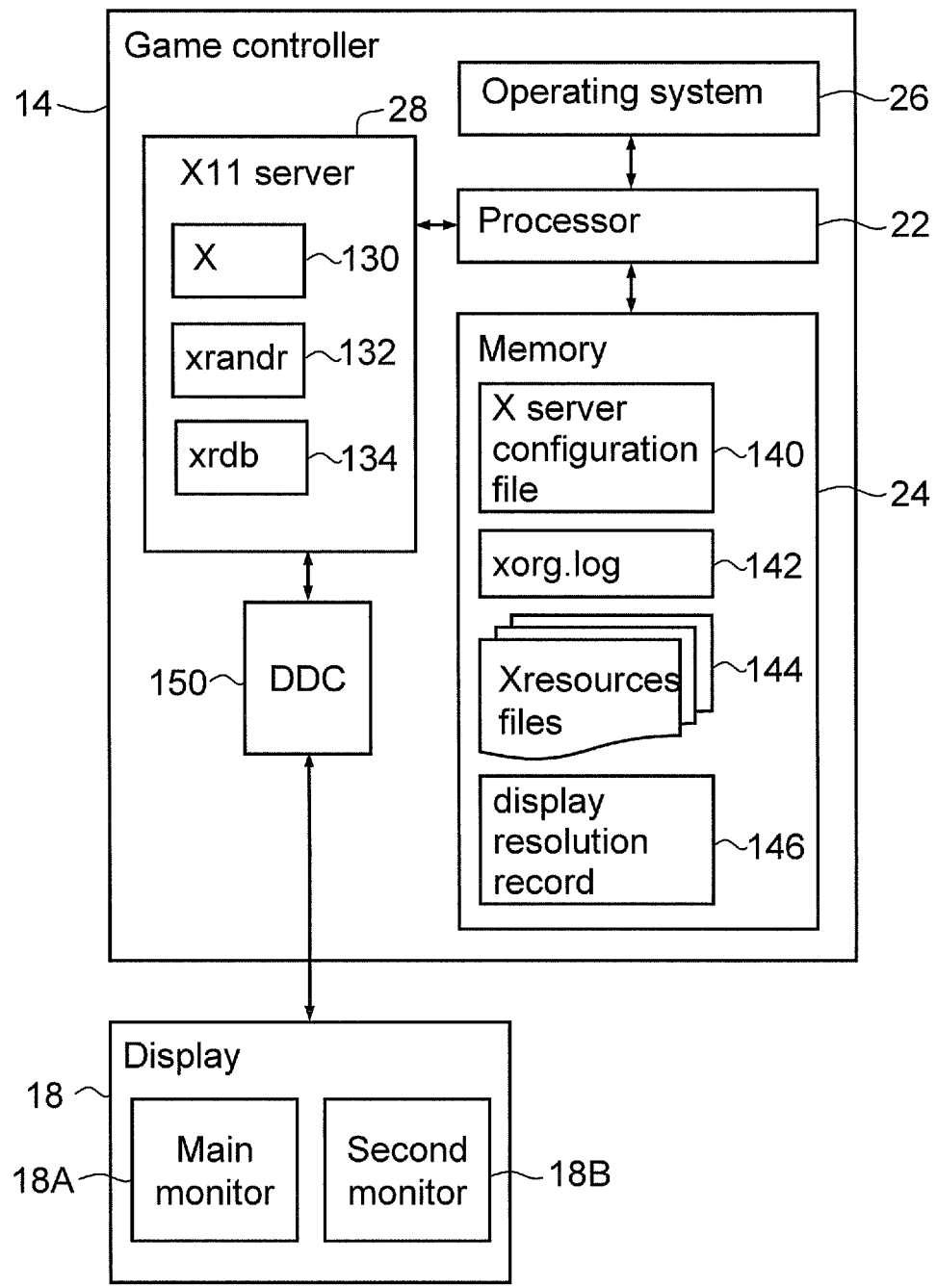
FIG. 6 is another view of the core components of the gaming system of FIG. 1, according to an embodiment of the invention.

FIG. 6 is another schematic view of display 18 and game controller 14 of FIG. 1 (with which game controller 62 of FIG. 3 is comparable), with more detail shown in the game controller 14. As mentioned above, display 18 comprises two monitors, a main monitor 18A and a second monitor 18B (just as display 34 of FIG. 3 comprises main monitor 34A and second monitor 34B and display 82 of FIG. 3 comprises main monitor 82A and second monitor 82B).

Figure 7A:
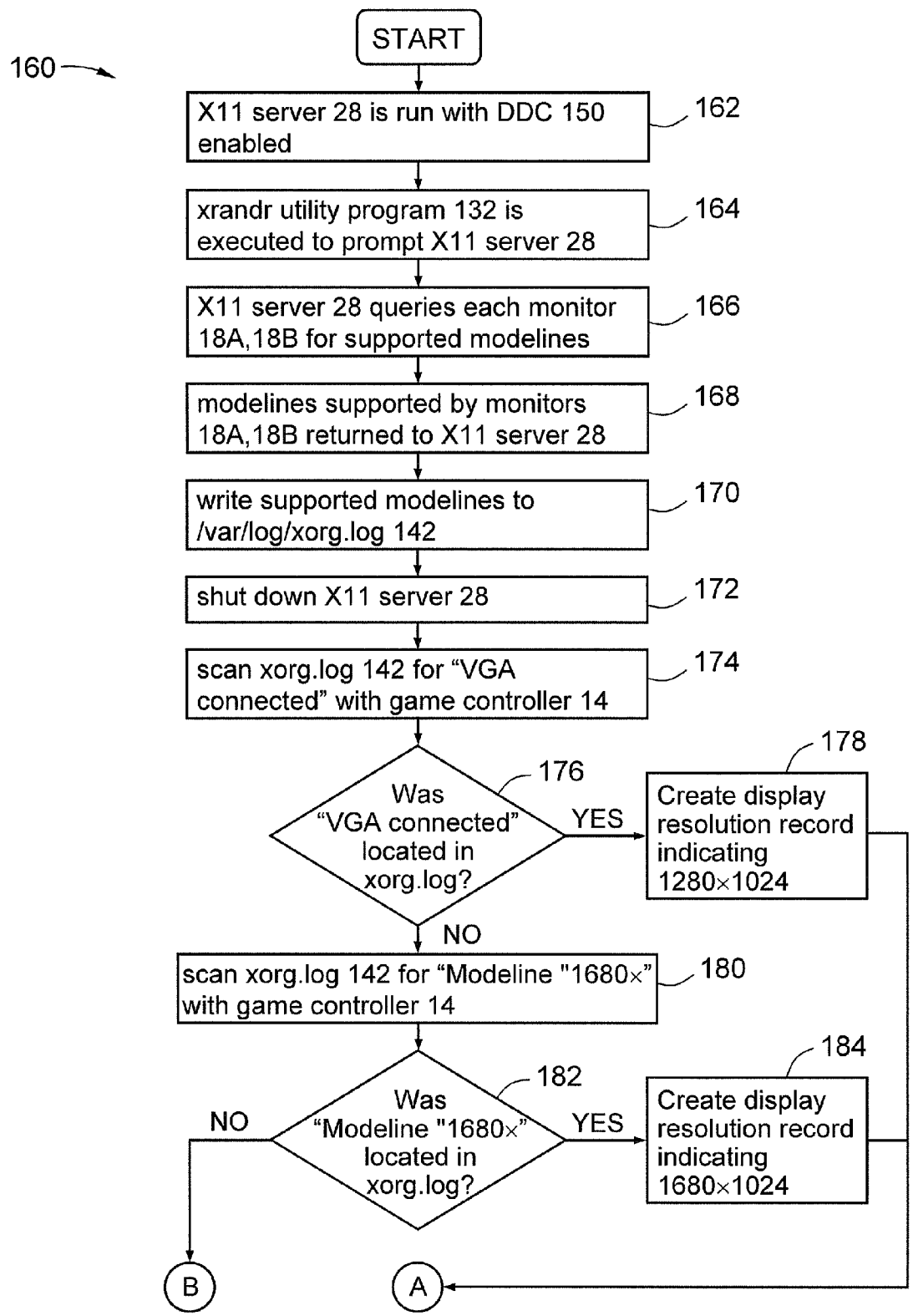
FIGS. 7A and 7B are a flowchart of a method of an embodiment of the invention.
Figure 7B:
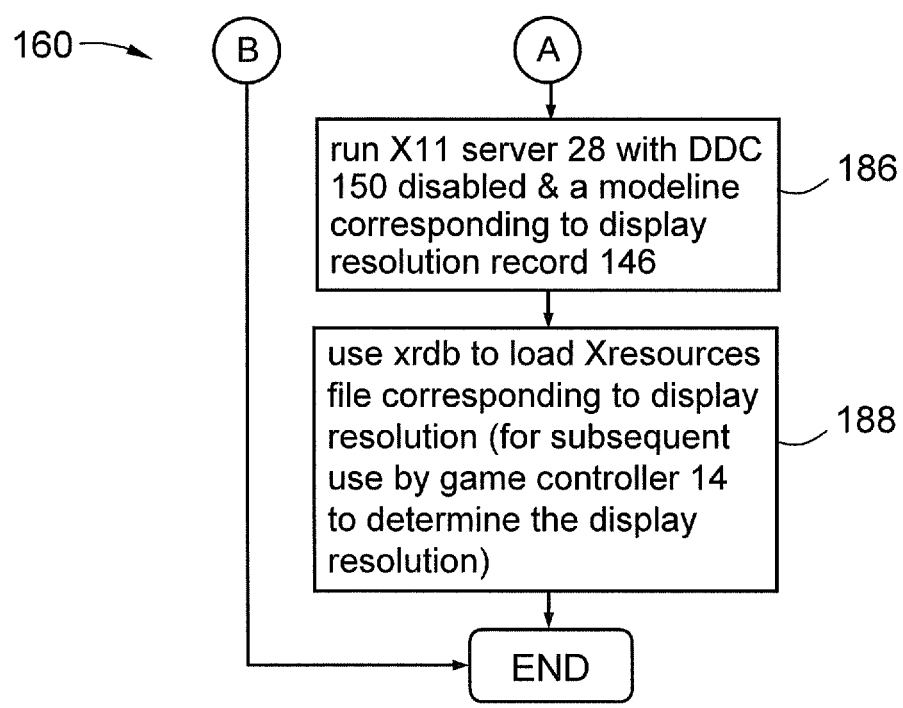

X11 server 28 of game controller 14 includes X 130, the xrandr utility program 132 and the xrdb utility program 134. Memory 24 includes an X server configuration file 140, a file /var/log/xorg.log 142 and Xresources files 144. Game controller 14 also includes a Display Data Channel (DDC) 150, which provides a digital connection between the monitors of display 18 and X11 server 28 of gaming machine 30; DDC 150 allows display 18 to communicate its specifications to X11 server 28. Support for DDC 150 is built into the kernel of operating system 26 of game controller 14, and is turned on in X server configuration file 140 if it is to be used. If DDC 150 is turned on in X server configuration file 140, X 130 automatically attempts to set the screen resolution and refresh rate to one that is supported by the monitor. This is a problem if the attached monitor has a resolution of, for example, 1680×1050 but—as in these embodiments—the displayed vertical resolution is to be set to 1024 in both monitors 18A,18B. Thus, in order to detect the resolutions supported by monitors 18A, 18B, 34A,34B, 82A, 82B and to set them both to have a vertical resolution of 1024, the following steps, illustrated in flow diagram 160 of FIGS. 7A and 7B, are performed according to the present embodiments. It should be noted that, in this example, it is assumed that both monitors 18A,18B, 34A, 34B, 82A, 82B in any particular gaming machine are identical, and that they are both either: (i) VGA 1280×1024, or (ii) 1680×1050.

Referring to FIG. 7A, at step 162 X11 server 28 is run with DDC 150 enabled. At step 164, xrandr utility program 132 is executed, and—at step 166—prompted by xrandr utility program 132, X11 server 28 queries monitors 18A,18B (via DDC 150) for their supported modelines.

At step 168, the modelines supported by monitors 18A, 18B are returned to X11 server 28 which, at step 170, writes this information to the file /var/log/xorg.log 142. This modeline data includes the resolutions supported by monitors 18A,18B.

At step 172, X11 server 28 is shut down. At step 174, game controller 14 scans xorg.log 142 for the text "VGA connected", to ascertain whether monitors 18A,18B support VGA (and hence, according to this example, have maximum resolutions of 1280×1024).

At step 176, it is determined whether the text "VGA connected" was located in xorg.log 142 (and hence whether monitors 18A,18B support VGA); if so processing continues at step 178, where a display resolution record 146 is created in memory 24 indicating that the resolution that monitors 18A, 18B will be set to is 1280×1024, as—according to this embodiment—other resolutions for VGA connected monitors are not supported. Processing then passes to step 186 (see FIG. 7B).

If, at step 176, it is determined that the text "VGA connected" was not located in xorg.log 142 and hence that monitors 18A,18B do not support VGA, processing continues at step 180 where game controller 14 scans xorg.log 142 for the text "Modeline "1680×"", that is, the other resolution expected to be found. At step 182, it is determined whether that text was located in xorg.log 142 and, if so, processing passes to step 184 where a display resolution record 146 is created in memory 24 indicating that the resolution that monitors 18A, 18B will be set to is 1680×1024. Game controller 14 does not, in this embodiment, support having two monitors with different resolutions so, as discussed above, gaming machines 30, 60, 104 are not provided with monitors 18A,18B of different resolutions; hence, if either monitor 18A,18B supports 1680 horizontal resolution, it can be assumed according got this embodiment that both do, so the displayed resolution is set to 1680×1024. Processing then continues at step 186 (see FIG. 7B).

At step 186, X11 server 28 is run with DDC 150 disabled and a modeline corresponding to display resolution record 146 as created at either step 178 or 184.

At step 188, xrdb utility program 134 is used to load the Xresources file 144 that corresponds to the display resolution indicated by display resolution record 146. Processing of the steps of this method then ends: the data in this Xresources file 144 is subsequently used by game controller 14 to determine the display resolution.

If, at step 182, it is determined that the text "Modeline "1680×"" was not located in xorg.log 142, processing ends.

It will be apparent, therefore, that the method of this embodiment could readily be used to check for other supported resolutions, or to set the resolution of one or more monitors to some other value or values as desired.

It will also be appreciated that other features known in electronic gaming machines and the games provided thereby can be advantageously and synergistically combined with the features described above.

Modifications and variations as would be apparent to a skilled addressee are deemed to be within the scope of the present invention.

In the claims that follow and in the preceding description of the invention, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to prior art is not intended to imply that such prior art forms or formed a part of the common general knowledge in any country.

The invention claimed is:

1. A method of setting the resolution of a display to which a computing device with a graphical windowing server displays, comprising:
   running the graphical windowing server with a digital connection enabled between the display and a graphics adapter for the display;
   querying the display with the digital connection for display modes supported by the display;
   receiving returned mode data, said mode data being indicative of one or more predefined display modes supported by the display;
   shutting down the graphical windowing server;
   selecting a modeline from a plurality of modelines for the display according to the returned mode data and a desired resolution, wherein each modeline is associated with one of the predefined display modes supported by the display;
   running the graphical windowing server with the digital connection disabled and the selected modeline; and
   loading a graphics specification corresponding to the resolution indicated by the predefined modeline.

2. The method as claimed in claim 1, and wherein the graphical windowing server comprises an X based graphical window server, the digital connection comprises a Display Data Channel and the graphics specification is contained in an Xresources file.

3. The method as claimed in claim 1, and further comprising selecting the desired resolution according to a resolution or resolutions identified by the returned mode data.

4. The method as claimed in claim 1, and wherein selecting the modeline comprises modifying a resolution identified by the returned mode data according to the desired resolution.

5. The method as claimed in claim 1, and wherein the mode data comprises a modeline or modelines.

6. The method as claimed in claim 1, and wherein querying the display comprises controlling the graphical windowing server to query the display with the digital connection.

7. The method as claimed in claim 1, and wherein the graphical windowing server comprises an X based graphical window server, the digital connection comprises a Display Data Channel and the graphics specification is contained in an Xresources file, and wherein querying the display comprises controlling the X based graphical window server to query the display with the Display Data Channel by executing an xrandr utility program.

8. The method as claimed in claim 1, and further comprising saving the returned modeline data.

9. The method as claimed in claim 1, and further comprising writing the returned modeline data to a file.

10. The method as claimed in claim 1, and further comprising conducting a search of the returned mode data for data indicative of one or more supported or desired graphics standards or resolutions.

11. The method as claimed in claim 10, and wherein the one or more graphics standards or resolutions comprises VGA.

12. The method as claimed in claim 10, and wherein the one or more graphics standards or resolutions comprises a number of columns.

13. The method as claimed in claim 10, and wherein the one or more graphics standards or resolutions comprises a number of rows.

14. The method as claimed in claim 1, and wherein loading the graphics specification comprises controlling the graphical windowing server to load the graphics specification.

15. The method as claimed in claim 1, and wherein the graphical windowing server displays to a plurality of different displays, and the method comprises setting the resolution of each of the plurality of displays to respective different resolutions.

16. The method as claimed in claim 1, and wherein the graphical windowing server displays to a plurality of different displays, and the method comprises setting the resolution of each of the plurality of displays to an identical resolution.

17. A computing system with a graphical windowing server displaying to a display, the computing system arranged to:
   run the graphical windowing server with a digital connection enabled between the display and a graphics adapter for the display;
   query the display with the digital connection for display modes supported by the display;
   receive returned mode data, said mode data being indicative of one or more predefined display modes supported by the display;
   shut down the graphical windowing server;
   select a modeline from a plurality of modelines for the display according to the returned mode data and a desired resolution, wherein each modeline is associated with one of the predefined display modes supported by the display;
   run the graphical windowing server with the digital connection disabled and the new selected modeline; and
   load a graphics specification corresponding to the resolution indicated by the new predefined modeline.

18. The computing system as claimed in claim 17, and wherein the graphical windowing server comprises an X based graphical windowing server, the digital connection comprises a Display Data Channel and the graphics specification is contained in an Xresources file.

19. The computing system as claimed in claim 17, and wherein the computing system is arranged to conduct a search of returned mode data for data indicative of one or more desired or supported graphics standards or resolutions.

20. The computing system as claimed in claim 17, and further comprising a gaming machine.

* * * * *